US010712260B2

(12) United States Patent
Zou

(10) Patent No.: US 10,712,260 B2
(45) Date of Patent: Jul. 14, 2020

(54) MONOLITHIC INTEGRATION DEVICE AND MICRO TOTAL ANALYSIS SYSTEM COMPRISING A MICRO-FLUIDIC FLOW CHANNEL

(71) Applicant: GOERTEK INC., Weifang, Shandong (CN)

(72) Inventor: Quanbo Zou, Weifang (CN)

(73) Assignee: GOERTEK INC., Weifang, Shandong (CN)

( * ) Notice: Subject to any disclaimer, the term of this patent is extended or adjusted under 35 U.S.C. 154(b) by 85 days.

(21) Appl. No.: 16/078,197

(22) PCT Filed: Jun. 2, 2016

(86) PCT No.: PCT/CN2016/084543
§ 371 (c)(1),
(2) Date: Aug. 21, 2018

(87) PCT Pub. No.: WO2017/206148
PCT Pub. Date: Dec. 7, 2017

(65) Prior Publication Data
US 2019/0049367 A1 Feb. 14, 2019

(51) Int. Cl.
G01N 21/25 (2006.01)
G01N 21/05 (2006.01)
G01N 21/64 (2006.01)
G01N 21/03 (2006.01)
G01N 21/77 (2006.01)

(52) U.S. Cl.
CPC ........... *G01N 21/255* (2013.01); *G01N 21/05* (2013.01); *G01N 21/64* (2013.01); *G01N 21/7703* (2013.01); *G01N 2021/0346* (2013.01); *G01N 2201/062* (2013.01); *G01N 2201/0626* (2013.01)

(58) Field of Classification Search
CPC ............. G01N 21/255; G01N 21/7703; G01N 2201/062; G01N 21/05
USPC ...................................... 250/214.1, 551, 239
See application file for complete search history.

(56) References Cited

U.S. PATENT DOCUMENTS 8,794,501 B2 * 8/2014 Bibl ........................ H01L 33/04
228/179.1
9,435,822 B2 * 9/2016 Snyman ................. G01D 5/266

FOREIGN PATENT DOCUMENTS

| CN | 102483427 A | 5/2012 |
| CN | 103824813 A | 5/2014 |
| CN | 105103292 A | 11/2015 |

* cited by examiner

Primary Examiner — Que Tan Le
(74) Attorney, Agent, or Firm — Saliwanchik, Lloyd & Eisenschenk

(57) ABSTRACT

The present invention discloses a monolithic integration device and micro Total Analysis System. The monolithic integration device for sensing comprises: a micro-LED; an optical detector; and a sensing channel, wherein the micro-LED is coupled with the sensing channel and is configured for emitting light into the sensing channel, and the optical detector is coupled with the sensing channel and is configured for sensing the light which is emitted by the micro-LED and travels through at least one part of the sensing channel. An embodiment of this invention proposes a new monolithic integration device for sensing with built-in light source and optical detection system.

10 Claims, 3 Drawing Sheets

US 10,712,260 B2

MONOLITHIC INTEGRATION DEVICE AND MICRO TOTAL ANALYSIS SYSTEM COMPRISING A MICRO-FLUIDIC FLOW CHANNEL

CROSS REFERENCE TO RELATED APPLICATIONS

This application is a National Stage of International Application No. PCT/CN2016/084543 filed on Jun. 2, 2016, which is hereby incorporated by reference in its entirety.

FIELD OF THE INVENTION

The present invention relates to the field of micro-LED, and in particular, to a monolithic integration device for sensing and a micro Total Analysis System (μTAS).

BACKGROUND OF THE INVENTION

The optical sensor, which can detect biological characteristics or gas characteristics, has obtained an extensive attention recently. Various optical sensors have been proposed.

For example, a planar waveguide optical sensor employing simple light coupling was proposed in the article of Torsten Mayr, et al, "A planar waveguide optical sensor employing simple light coupling", Analyst, 2009, 134, 1544-1547, which is hereby incorporated herein by reference.

For example, fast response oxygen micro-optodes based on novel noluble ormosil glasses have been proposed in the article of Klimant, et al, "Fast Response Oxygen Micro-Optodes Based on Novel Soluble Ormosil Glasses", Microchim. Acta, 131, 1999, 35, which is hereby incorporated herein by reference.

These optical sensors are of relatively large size and are generally not suitable for on-site applications.

A micro Total Analysis System (μTAS) is a portable apparatus for chemistry analysis, which is also called as Lab-on-a-chip (LOC). The μTAS is suitable for on-site application and makes the analysis much easier.

The micro-fluidics is a fluidics in a small scale. The micro-fluidic can be examined to obtain the biological or chemistry characteristics thereof. These biological or chemistry characteristics can be used to determine the substance or object under examination.

The monolithic integration means an integrated circuit which implements a desired circuit function independently. For example, in a monolithic integration of optical sensor, the light source and the optical detector shall be integrated in a single chip.

Therefore, there is a demand in the art that a new optical sensor shall be proposed to address at least one of the problems in the prior art.

SUMMARY OF THE INVENTION

One object of this invention is to provide a new technical solution for monolithic integration device for sensing.

According to a first aspect of the present invention, there is provided a monolithic integration device for sensing, comprising: a micro-LED; an optical detector; and a sensing channel, wherein the micro-LED is coupled with the sensing channel and is configured for emitting light into the sensing channel, and the optical detector is coupled with the sensing channel and is configured for sensing the light which is emitted by the micro-LED and travels through at least one part of the sensing channel.

Alternatively or in addition, the sensing channel is a micro-fluidic channel in which micro-fluidics can flow.

Alternatively or in addition, the micro-LED is, mounted on a substrate and a cover with trench is attached on the substrate to form the sensing channel.

Alternatively or in addition, the micro-LED and the optical detector are located in the same cross section of the sensing channel.

Alternatively or in addition, the sensing channel is a waveguide in which the light emitted by the micro-LED can travel.

Alternatively or in addition, the waveguide is a planar waveguide and the micro-LED is mounted on a surface of the planar waveguide.

Alternatively or in addition, the monolithic integration device further comprises: a coupling component for coupling light emitted by the micro-LED into the waveguide.

Alternatively or in addition, the micro-LED and the optical detector are arranged in a longitudinal direction of the sensing channel.

Alternatively or in addition, the micro-LED is 1-100 μm in side length and 1-10 μm in thickness.

According to a second aspect of the present invention, there is provided a micro Total Analysis System comprising the monolithic integration device for sensing of the present invention.

An embodiment of this invention proposes a new monolithic integration device for sensing with built-in light source and optical detection system. This monolithic integration device is suitable for on-site applications, such as a micro Total Analysis System.

Further features of the present invention and advantages thereof will become apparent from the following detailed description of exemplary embodiments according to the present invention with reference to the attached drawings.

BRIEF DISCRIPTION OF THE DRAWINGS

The accompanying drawings, which are incorporated in and constitute a part of the specification, illustrate embodiments of the invention and, together with the description thereof, serve to explain the principles of the invention.

DETAILED DESCRIPTION OF THE EMBODIMENTS

Figure 1:
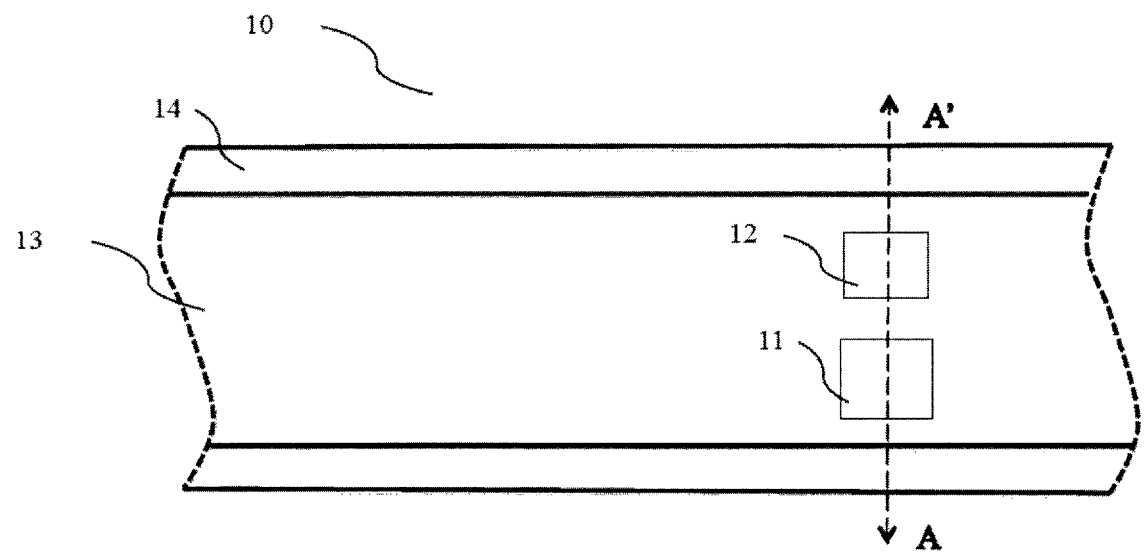
FIG. 1 is a schematic diagram of a portion of a monolithic integration device for sensing according to a first embodiment.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

In the prior art, the optical sensors are of relatively large size. The traditional light source of the sensor is relatively complicated. Besides, the traditional light source is relatively large. Furthermore, its cost is relatively high. Similar defects also exist in the optical detection system of the optical sensors.

In embodiments of this application, it is proposed to use micro-LED as light source. As a result, a simple photo diode can be used as an optical detector. By means of this arrangement, the size of the sensor can be significantly reduced and thus it is suitable for on-site applications such as μTAS.

Figure 2:
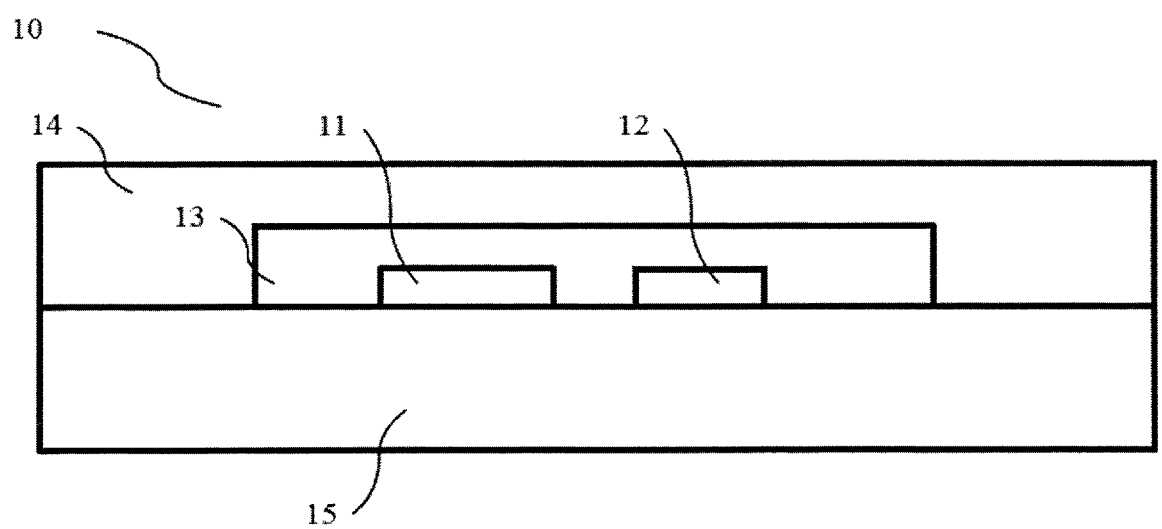
FIG. 2 is a cross-section view of the monolithic integration device taken from the line A-A' in FIG. 1.

A first embodiment will be described with reference to FIGS. 1 and 2. FIG. 1 shows a schematic diagram of a portion of a monolithic integration device for sensing according to the first embodiment. FIG. 2 shows a cross-section view of the monolithic integration device taken from the line A-A' in FIG. 1.

As shown in FIG. 1, the monolithic integration device for sensing 10 comprises a micro-LED 11, an optical detector 12 and a sensing channel 13. The monolithic integration device for sensing 10 is a chip, for example.

The micro-LED 11 is coupled with the sensing channel 13 and is configured for emitting light into the sensing channel 13.

The substance to be examined can travel or go through the sensing channel. The substance can be light reflected from the object to be examined or micro-fluidics to be examined and so on.

The optical detector 12 is coupled with the sensing channel 13 and is configured for sensing the light which is emitted by the micro-LED 11 and travels through at least one part of the sensing channel 13. The optical detector 12 can be a photo diode, for example.

For example, as shown in FIG. 2, the micro-LED 11 is mounted on a substrate 15. The optical detector 12 is also mounted on the substrate 15. A cover 14 with trench is attached on the substrate 15 to form the sensing channel 13.

In an example, the sensing channel 13 is a micro-fluidic channel in which micro-fluidics can flow. For example, the light emitted by the micro-LED 11 will interact with the micro-fluidics in the sensing channel 13 and be detected by the optical detector 12. From the light detected by the optical detector 12, the characteristics of the micro-fluidics can be determined so that the characteristics of the object under examination will be determined. Thus, the object under examination may be determined.

In the example of FIG. 2, the micro-LED 11 and the optical detector 12 are located in the same cross section of the sensing channel 13. For example, this arrangement is suitable for detecting the fluidics containing different substances arriving at the cross section at different timings. This may be suitable for DNA detection.

In this embodiment, the micro-LED 11 is 1-100 μm in side length and 1-10 μm in thickness, for example. The micro-LED 11 can emit red light, green light, blue light or UV, etc.

For example, the substrate 15 can be anyone of silicon, other semiconductor, glass, ceramic, quartz, sapphire, polymer, elastomer (such as PDMS, PMMA, SU8, etc.) and so on.

In this embodiment, the micro-LED is built-in the microfluidic channel (chamber) as light source. By this arrangement, the light source and the optical detection system can be integrated into a monolithic chip. This is suitable for a real time analysis application, such as a μTAS.

In a preferable example, an array of such micro-LEDs 11 is built in the sensing channel. This arrangement could produce a more accurate "spatial" analysis for the microfluidics flowing in the sensing channel.

Figure 3:
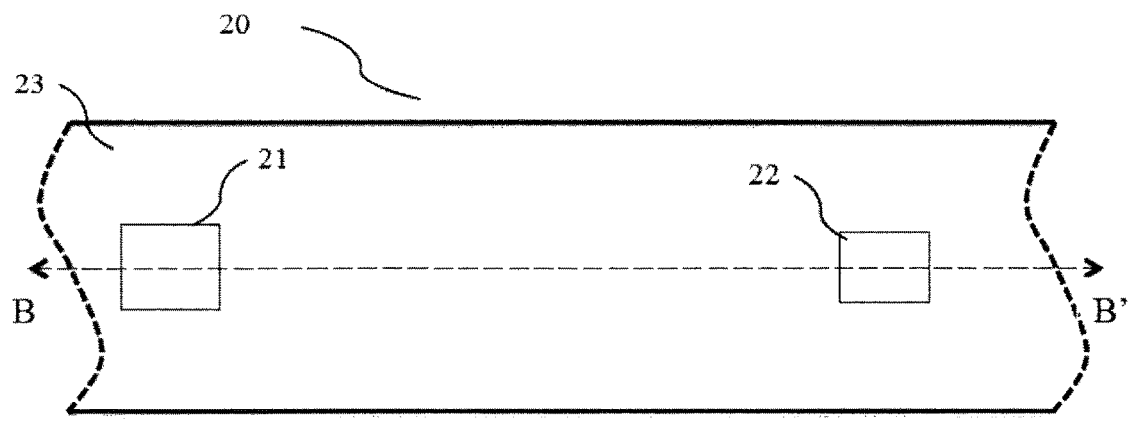
FIG. 3 is a schematic diagram of a portion of a monolithic integration device for sensing according to a second embodiment.
Figure 4:
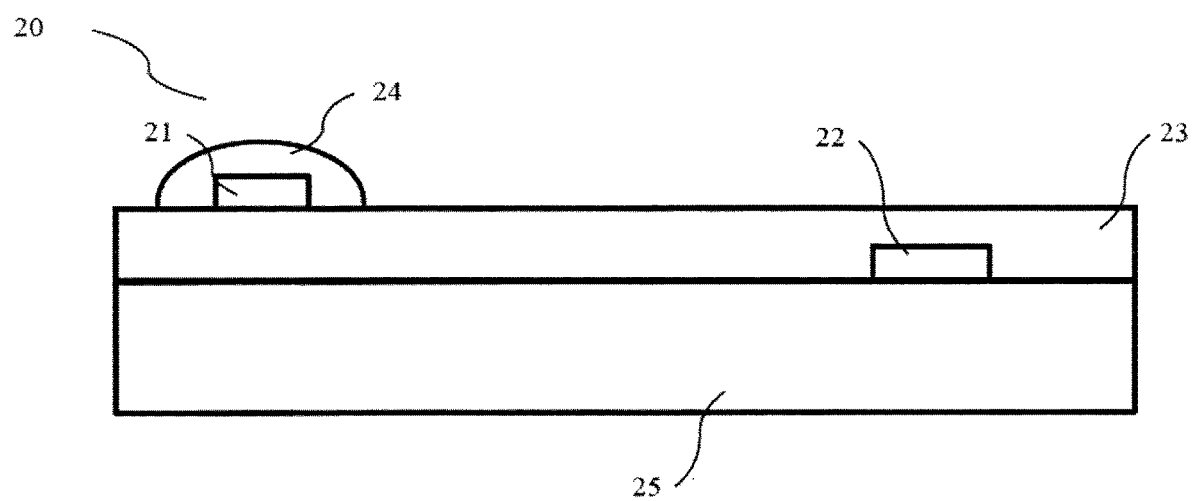
FIG. 4 is a cross-section view of the monolithic integration device taken from the line B-B' in FIG. 3.

A second embodiment will be described with reference to FIGS. 3 and 4. FIG. 3 shows a schematic diagram of a portion of a monolithic integration device for sensing according to the second embodiment. FIG. 4 shows a cross-section view of the monolithic integration device taken from the line B-B' in FIG. 3. The repetitive contents with the first embodiment will be omitted.

As shown in FIG. 3, a monolithic integration device for sensing 20 comprises a micro-LED 21, an optical detector 22 and a sensing channel 23.

The micro-LED 21 is coupled with the sensing channel 23 and is configured for emitting light into the sensing channel 23. The optical detector 22 is coupled with the sensing channel 23 and is configured for sensing the light which is emitted by the micro-LED 21 and travels through at least one part of the sensing channel 23.

In this embodiment, the sensing channel 23 is a waveguide in which the light emitted by the micro-LED can travel.

As shown in FIG. 4, the waveguide 23 is a planar waveguide. The micro-LED 21 is mounted on a surface of the planar waveguide 23. For example, the micro-LED 21 is mounted on a surface of the planar waveguide 23 through bonding or gluing. For example, the micro-LED 21 can be interconnected with input signals through be wire-bond or flip-chip.

As shown in FIG. 4, a coupling component for coupling light emitted by the micro-LED into the waveguide may be arranged. The coupling component will enhance the coupling of the light source and the waveguide to let more light going into the waveguide.

As shown in FIG. 4, the micro-LED and the optical detector can be arranged in a longitudinal direction of the sensing channel.

Figure 5:
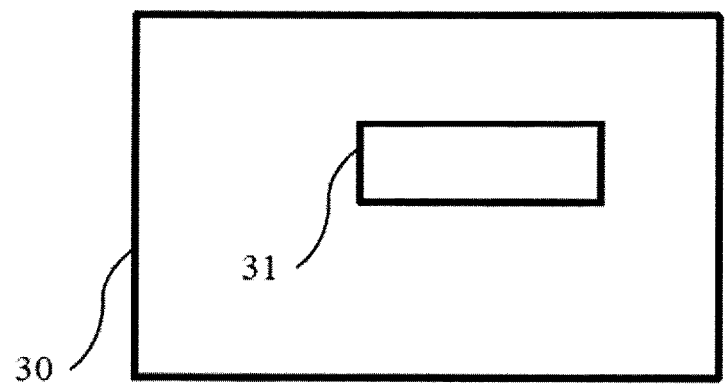
FIG. 5 shows a micro Total Analysis System with a monolithic integration device for sensing according to embodiments of this invention.

FIG. 5 shows a micro Total Analysis System with a monolithic integration device for sensing according to embodiments of this invention.

As shown in FIG. 5, the micro Total Analysis System 30 comprises a monolithic integration device for sensing 31. The monolithic integration device for sensing 31 can be the monolithic integration device 10 according to the first embodiment or the monolithic integration device 20 according to the second embodiment.

For example, the micro Total Analysis System 30 is suitable for on-site applications. The micro Total Analysis System 30 can be used in personalized medical service, personalized genomic technology and so on.

Although some specific embodiments of the present invention have been demonstrated in detail with examples, it should be understood by a person skilled in the art that the above examples are only intended to be illustrative but not to limit the scope of the present invention. It should be understood by a person skilled in the art that the above embodiments can be modified without departing from the scope and spirit of the present invention. The scope of the present invention is defined by the attached claims.

What is claimed is:

1. A monolithic integration device for sensing, comprising:
   a micro-LED;
   an optical detector; and
   a sensing channel,
   wherein the micro-LED is coupled with the sensing channel and is configured for emitting light into the sensing channel, and the optical detector is coupled with the sensing channel and is configured for sensing the light which is emitted by the micro-LED and travels through at least one part of the sensing channel, and
   wherein the sensing channel is a micro-fluidic channel in which micro-fluidics can flow.

2. The monolithic integration device according to claim 1, wherein the micro-LED is mounted on a substrate and a cover with trench is attached on the substrate to form the sensing channel.

3. The monolithic integration device according to claim 1, wherein the micro-LED and the optical detector are located in the same cross section of the sensing channel.

4. The monolithic integration device according to claim 1, wherein the sensing channel is a waveguide in which the light emitted by the micro-LED can travel.

5. The monolithic integration device according to claim 4, wherein the waveguide is a planar waveguide and the micro-LED is mounted on a surface of the planar waveguide.

6. The monolithic integration device according to claim 5, further comprising: a coupling component for coupling light emitted by the micro-LED into the waveguide.

7. The monolithic integration device according to claim 4, wherein the micro-LED and the optical detector are arranged in a longitudinal direction of the sensing channel.

8. The monolithic integration device according to claim 1, wherein the micro-LED is 1-100 μm in side length and 1-10 μm in thickness.

9. A micro Total Analysis System comprising the monolithic integration device for sensing of claim 1.

10. The monolithic integration device according to claim 1, wherein an array of the micro-LEDs is built in the sensing channel.

* * * * *